United States Patent [19]
Spell et al.

[11] Patent Number: 6,045,156
[45] Date of Patent: Apr. 4, 2000

[54] SUPPLEMENT RESTRAINT SYSTEM HAVING DEPLOYMENT INHIBIT APPARATUS

[75] Inventors: David Martin Spell, Kokomo; Michael K. Walden, Noblesville; Johnny Lee Lyons, Kokomo, all of Ind.

[73] Assignee: Delco Electronics Corp., Kokomo, Ind.

[21] Appl. No.: 09/119,822

[22] Filed: Jul. 21, 1998

[51] Int. Cl.[7] .................................................. B60R 21/01
[52] U.S. Cl. ........................... 280/735; 701/45; 307/10.1
[58] Field of Search .............................. 280/735; 701/45; 307/10.1; 340/436, 438

[56] References Cited

U.S. PATENT DOCUMENTS

| | | | |
|---|---|---|---|
| 5,544,914 | 8/1996 | Borninski et al. | 280/735 |
| 5,825,098 | 10/1998 | Darby et al. | 701/45 |
| 5,915,725 | 6/1999 | Cuddihy et al. | 280/735 |
| 5,918,899 | 7/1999 | Watanabe | 280/735 |

*Primary Examiner*—Peter C. English
*Attorney, Agent, or Firm*—Jimmy L. Funke

[57] ABSTRACT

An improved automotive supplemental inflatable restraint system featuring a cost-effective approach to driver initiated inhibiting of air bag deployment. A multi-position key-operated switch is coupled to a circuit external to the sensing and diagnostic module (SDM) that is interfaced to the vehicle communications bus. The circuit interprets the switch position, and sends a message to the SDM via the communications bus indicating which, if any, of the air bags are to be inhibited. Since the SDM is normally configured for communications over the communications bus, the only cost impact on the SDM is that of a software modification. Additionally, the external circuitry is simple, and the switch can be low cost since it is not connected in the deployment loop of an air bag, and since one switch can be used to signal multiple inhibit selections. The external circuit may include a microprocessor and bus interface as a stand-alone device, or may be up-integrated into an existing vehicle electronic module such as a body computer.

3 Claims, 2 Drawing Sheets

SUPPLEMENT RESTRAINT SYSTEM HAVING DEPLOYMENT INHIBIT APPARATUS

This invention relates to automotive supplemental inflatable restraint (SIR) systems, and more particularly to a SIR deployment inhibit apparatus.

BACKGROUND OF THE INVENTION

It has been recognized that it is desirable to have the capability of selectively disabling or inhibiting deployment of the passenger-side and/or driver-side frontal air bags under circumstances where deployment could result in more harm than good. Accordingly, some automotive original equipment manufacturers (OEMs) have produced vehicles with key-operated cut-off switches for this purpose. Additionally, after-market products are available for retrofitting older vehicles to provide a similar cut-off function.

An example of an OEM SIR system with a cut-off switch is depicted in FIG. 1, where the reference numeral 10 designates an airbag controller (also referred to herein as a sensing and diagnostic module, or SDM) mounted in a protected, central portion of a vehicle. Operating voltage from a vehicle storage battery 12 is supplied to the SDM 10 via a key-operated ignition switch 14, and is designated as the ignition voltage $V_{IGN}$. The SDM 10 includes an acceleration sensor AS for sensing longitudinal acceleration of the vehicle, a microprocessor $\mu P$ for receiving the output signal of acceleration sensor AS, and a pair of driver circuits 16, 18 coupled to squibs or initiators 20, 22 to deploy the driver-side and passenger-side frontal air bags (not shown) on command of microprocessor $\mu P$ in the event of a severe crash. The microprocessor $\mu P$ is typically coupled to a communications bus B, illustrated in FIG. 1 as a two-wire bus, via a bus interface module, as are other electronic modules such as the illustrated Body Computer. The SDM 10 may receive certain information such as vehicle speed over bus B, and may provide certain information to other modules via bus B. Additionally, the microprocessor may be coupled to an instrument panel lamp 24 via lamp driver LD for warning the driver of a system failure.

In the illustrated embodiment, deployment of the air bag associated with squib 22 (typically the passenger-side frontal air bag) requires enablement of driver circuit 18 by a Logic Circuit in addition to a triggering signal from microprocessor $\mu P$. A key-operated single-throw double-pole cut-off switch 26 located external to SDM 10 is coupled to the SDM Logic Circuit to enable driver control of the cut-off function. In the normal switch configuration depicted in FIG. 1, the switch 26 couples the ignition voltage $V_{IGN}$ to Logic Circuit through a resistor 28. Logic Circuit recognizes this as an enabling condition, and enables driver circuit 18 so that the passenger-side frontal air bag can be deployed by microprocessor $\mu P$ in the event of a severe crash. However, when the key 30 is used to change the state of switch 26, the ignition voltage path through resistor 28 is opened, and the switch 26 couples the ignition voltage $V_{IGN}$ to a different input of Logic Circuit through a lamp 32, which illuminates to warn the vehicle occupants that the passenger-side frontal air bag is disabled. The Logic Circuit recognizes this as a cut-off activation, and removes the enabling voltage from driver circuit 18, effectively inhibiting deployment of the passenger-side frontal air bag.

FIG. 2 shows a different approach used to retrofit older vehicles that do not have a Logic Circuit of the type depicted in FIG. 1. In this case, a single-throw, double-pole switch 40 is inserted between the driver circuit 18 and the squib 22. In the normal switch position depicted in FIG. 2, the driver circuit 18 is connected across squib 22, whereas in the activated position, the driver circuit 18 is isolated from squib 22, and is instead connected across a resistor 42.

The two approaches discussed above are both disadvantageous in terms of cost. The OEM approach of FIG. 1 requires a special SDM 10 with additional circuitry (Logic Circuit) and I/O pins compared to a standard SDM, which increases cost and part proliferation. The after-market approach of FIG. 2 has no impact on the cost of the SDM, but requires an expensive, high current switch since the switch 40 is inserted directly in the firing loop of the passenger-side frontal air bag. These disadvantages become especially apparent, particularly in the after-market approach, when the cut-off function is needed for multiple air bags.

SUMMARY OF THE PRESENT INVENTION

The present invention is directed to an improved automotive SIR system featuring a cost-effective approach to driver initiated inhibiting of air bag deployment. A multi-position key-operated switch is coupled to a circuit external to the SDM that is interfaced to the vehicle communications bus. The circuit interprets the switch position, and sends a message to the SDM via the communications bus indicating which, if any, of the air bags are to be inhibited. Since the SDM is normally configured for communications over the communications bus, the only cost impact on the SDM is that of a software modification. Additionally, the external circuitry is simple, and the switch can be low cost since it is not connected in the deployment loop of an air bag, and since one switch can be used to signal multiple inhibit selections. The external circuit may include a microprocessor and bus interface as a stand-alone device, or may be up-integrated into an existing vehicle electronic module such as a body computer.

DETAILED DESCRIPTION OF THE DRAWINGS

Figure 1:
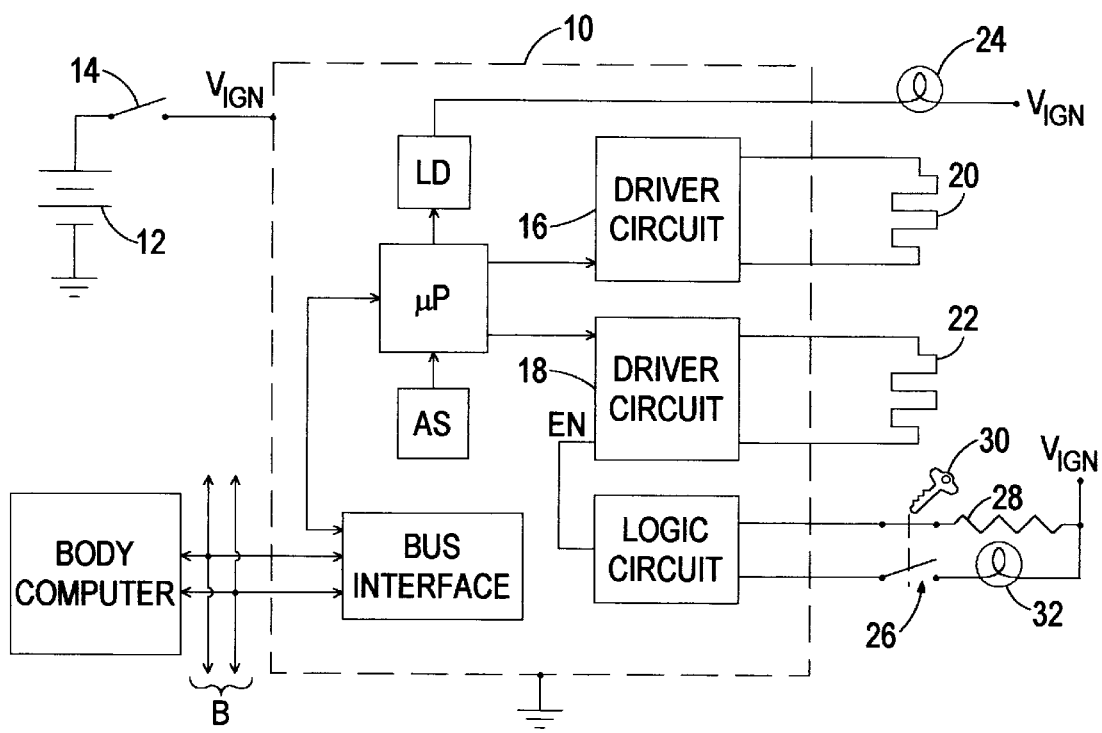
FIG. 1 is schematic diagram of an OEM prior art SIR system having a deployment inhibit apparatus.
Figure 2:
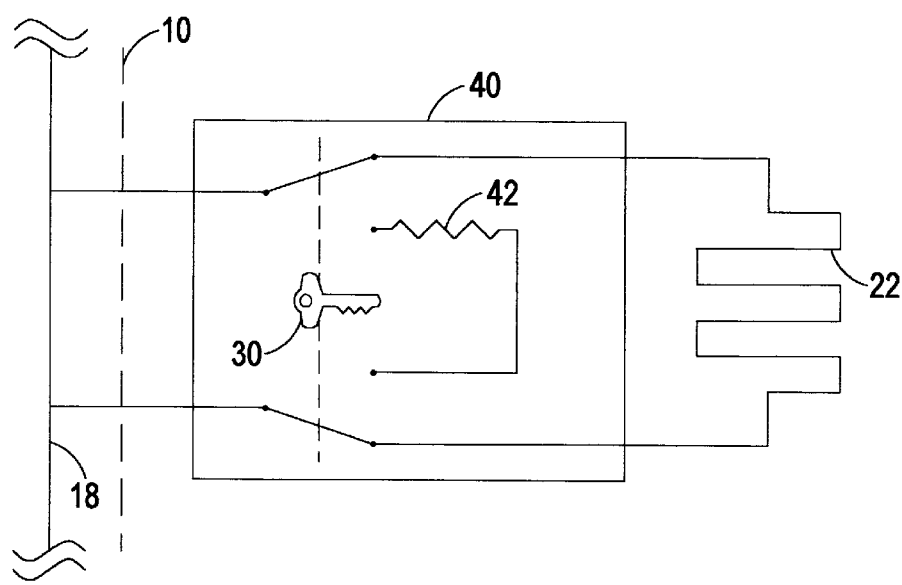
FIG. 2 is a schematic diagram of an after-market prior art deployment inhibit switch mechanization.
Figure 3:
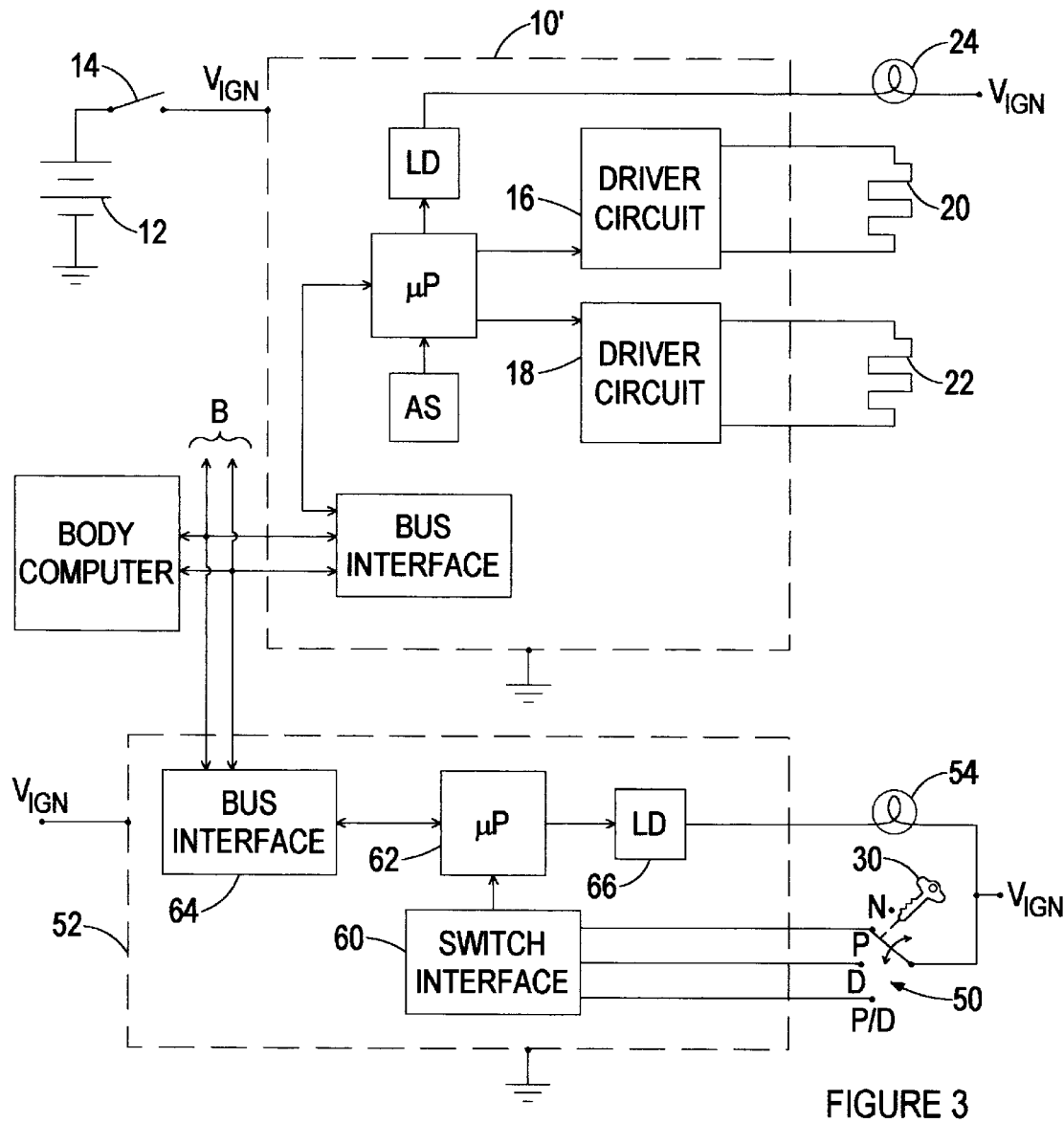
FIG. 3 is a schematic diagram of an SIR system having a deployment inhibit apparatus according to this invention.
Figure 4:
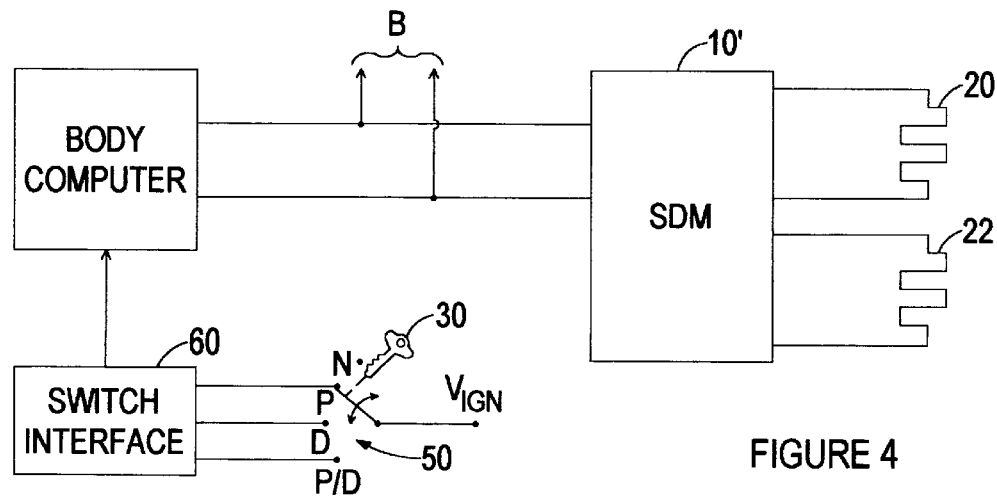
FIG. 4 is a schematic diagram of an alternate mechanization of the deployment inhibit apparatus of this invention.

FIGS. 3 and 4 depict the inhibit apparatus of this invention in the environment of the SIR system of FIG. 1, discussed above. Accordingly, the common elements, which have been assigned corresponding reference numerals, are not specifically described here. However, the SDM of FIGS. 3–4 is designated by the reference numeral 10' since it does not include the Logic Circuit of FIG. 1, or the input lines associated with the Logic Circuit. In other words, the SDM 10' is a conventional off-the-shelf circuit from a hardware standpoint, of the type used in vehicles not having a cut-off switch.

According to the invention, a flexible deployment cut-off function is provided with a conventional SDM 10' through the use of an external circuit disposed remote from SDM 10' and communicating with SDM 10' via a communication bus B interconnecting SDM 10' and the external circuit. In the embodiment of FIG. 3, the external circuit is in the form of a deployment inhibit module 52, whereas in the embodiment of FIG. 4, the external circuit is largely up-integrated into an existing electronic module such as a Body Computer.

Referring particularly to FIG. 3, the deployment inhibit module 52 essentially provides an interface between the communications bus B and a multi-position cut-off switch 50. The switch outputs, designated a P (passenger-side frontal air bag), D (driver-side frontal air bag) and P/D (passenger-side and driver-side frontal air bags) are supplied as inputs to the Switch Interface circuit 60 within module 52. In a normal (N) position of switch 50, the ignition voltage $V_{IGN}$ is isolated from the switch outputs, which the Switch Interface 60 interprets as a normal deployment mode. In the switch position illustrated in FIG. 3, the ignition voltage $V_{IGN}$ is applied to the P switch output, which the Switch Interface 60 interprets as an inhibit command for the passenger-side frontal air bag. When switch 50 is in the D state, the ignition voltage $V_{IGN}$ is applied to the D switch output, which the Switch Interface 60 interprets as an inhibit command for the driver air bag. Finally, when switch 50 is in the P/D state, the ignition voltage $V_{IGN}$ is applied to the P/D switch output, which the Switch Interface 60 interprets as an inhibit command for both the driver-side and passenger-side frontal air bags. Thus, the Switch Interface 60 may be implemented with a simple logic circuit, such as a conventional encoder.

The Switch Interface 60 provides an input to a deployment inhibit module microprocessor 62, which in turn, signals the Bus Interface 64 to transmit a message containing the switch state to SDM 10' over communications bus B. Additionally, the microprocessor 62 energizes a lamp 54 via lamp driver (LD) 66 to warn the occupants of an air bag deployment inhibit if a switch state other than the normal state is selected. In this regard, the lamp 54 may be configured to provide specific information as to which air bag(s) is inhibited.

In the alternative embodiment depicted in FIG. 4, the switch interface 60 is a stand-alone circuit that provides an input to a Body Computer or other electronic module connected to the communications bus B. In this case, the functions of microprocessor 62, bus interface 64 and lamp driver 66 are performed by circuits which are typically already resident within the Body Computer, thereby further minimizing system cost.

With either of the above-described embodiments, the only required modification of the SDM 10' compared to a conventional SDM is that its microprocessor software is modified to recognize a message commanding an inhibit of one or more air bags. Obviously, this is a minor modification, as the conventional or off-the-shelf SDM is already programmed to recognize other messages received over communications bus B. Then, in the deployment loop of the program, the microprocessor μP must determine if deployment of one or more of the air bags is inhibited, and if so, to bypass the portion of the program that develops the respective deployment command(s). Thus, the cost impact to a conventional, off-the-shelf SDM is minimal.

In summary, the deployment inhibit apparatus of this invention provides a low cost solution to operator activated inhibition of air bag deployment, compared to other approaches. In addition, the approach of this invention offers increased flexibility since the inhibit function can be easily extended to other restraint devices without significantly impacting system cost. While described in reference to the illustrated embodiment, it is expected that various modifications in addition to those suggested above will occur to those skilled in the art. In this regard, it will be understood that this invention is not limited to the illustrated embodiment, and that systems incorporating such modifications may fall within the scope of this invention, which is defined by the appended claims.

The embodiments of the invention in which an exclusive property or privilege in claimed are defined as follows:

1. A vehicular supplemental restraint system including a restraint deployment module for deploying one or more restraint devices for protection of vehicle occupants in a crash event, and a cut-off switch activated by a vehicle operator desiring to inhibit deployment of one or more selected restraint devices, comprising:

a deployment inhibit module disposed remote from said restraint deployment module, and coupled to said cut-off switch for identifying the one or more selected restraint devices indicated by activation of said switch; and a communication bus interconnecting said deployment inhibit module and said restraint deployment module, said deployment inhibit module signaling said restraint deployment module to inhibit deployment of the one or more selected restraint devices identified by said deployment inhibit module.

2. Deployment inhibit apparatus for a vehicular supplemental restraint system in which a restraint deployment module is configured to deploy a plurality of restraint devices for protection of vehicle occupants in a crash event, the deployment inhibit apparatus comprising:

a cut-off switch activated by a vehicle operator desiring to inhibit deployment of one or more of the plurality of restraint devices;

a deployment inhibit module disposed remote from said restraint deployment module, and coupled to said cut-off switch for identifying the one or more restraint devices for which the operator desires to inhibit deployment; and a communication bus interconnecting said deployment inhibit module and said restraint deployment module, said deployment inhibit module including a bus interface circuit for signaling said restraint deployment module to inhibit deployment of the one or more restraint devices identified by said deployment inhibit module.

3. Deployment inhibit apparatus for a vehicular supplemental restraint system in which a restraint deployment module is configured to deploy driver-side and passenger-side frontal inflatable restraints for protection of vehicle occupants in a crash event, the deployment inhibit apparatus comprising:

a cut-off switch activated by a vehicle operator for selecting non-deployment of one or both of the driver-side and passenger-side frontal inflatable restraints;

a deployment inhibit module disposed remote from said restraint deployment module, and coupled to said cut-off switch for developing an inhibit signal indicating which of the restraint devices have been selected for non-deployment; and a communication bus interconnecting said deployment inhibit module and said restraint deployment module, said deployment inhibit module including a bus interface circuit for transmitting said inhibit signal to said restraint deployment module to inhibit deployment of the restraint devices selected for non-deployment by said operator.

* * * * *